United States Patent [19]

Matsuno et al.

[11] Patent Number: 4,707,505

[45] Date of Patent: Nov. 17, 1987

[54] GLASS FIBER REINFORCED PROPYLENE-ETHYLENE COPOLYMER BASE RESIN COMPOSITION

[75] Inventors: Yoshio Matsuno, Machida; Toshio Miyamoto, Tokyo; Hideyo Morita, Sakai, all of Japan

[73] Assignee: Nissan Motor Co. Ltd., Yokohama, Japan

[21] Appl. No.: 891,375

[22] Filed: Jul. 31, 1986

[30] Foreign Application Priority Data

Aug. 10, 1985 [JP] Japan ............................... 60-176011

[51] Int. Cl.⁴ ..................... C08K 3/40; C08K 7/14; C08K 9/06

[52] U.S. Cl. ............................. 523/203; 523/212; 523/213; 523/214; 523/217; 524/447; 524/450; 524/451; 524/456; 524/504

[58] Field of Search ............... 523/203, 212, 213, 214, 523/217; 524/447, 494, 504

[56] References Cited

U.S. PATENT DOCUMENTS

| | | | |
|---|---|---|---|
| 4,404,312 | 9/1983 | Kokubu et al. | 524/504 |
| 4,417,019 | 11/1983 | Yamamoto | 524/456 |
| 4,469,138 | 9/1984 | Satoh | 524/495 |
| 4,477,617 | 10/1984 | Murphy | 524/505 |
| 4,480,065 | 10/1984 | Kawai et al. | 524/494 |
| 4,603,153 | 7/1986 | Sobajima et al. | 523/209 |
| 4,621,115 | 11/1986 | Morita et al. | 524/494 |

FOREIGN PATENT DOCUMENTS

| | | |
|---|---|---|
| 2845038 | 5/1979 | Fed. Rep. of Germany . |
| 3131152 | 2/1983 | Fed. Rep. of Germany . |
| 0037036 | 3/1983 | Japan ............................... 524/504 |
| 0212440 | 10/1985 | Japan ............................... 524/504 |
| 0212441 | 10/1985 | Japan ............................... 524/504 |
| 1123642 | 6/1986 | Japan ............................... 524/494 |

OTHER PUBLICATIONS

Patents Abstracts of Japan C-141, Dec. 21, 1982, vol. 6/No. 261; Japanese Patent Disclosure No. 57-155246, Sep. 1982.

Primary Examiner—Herbert J. Lilling
Attorney, Agent, or Firm—Schwartz, Jeffery, Schwaab, Mack, Blumenthal & Evans

[57] ABSTRACT

A glass fiber reinforced resin composition suitable as an injection molding material for automobile instrument panels. Essentially the resin composition is a blend of 55-77 wt % of a propylene-ethylene block copolymer at least partially modified by graft copolymerization with an unsaturated carboxylic acid or its derivative, 5-15 wt % of an ethylene-propylene rubber in which the content of ethylene is 60-85 wt % and 18-30 wt % of glass fiber having a filament diameter of 8-15 μm. The melt flow index of the modified propylene-ethylene block copolymer and the Mooney viscosity of the ethylene-propylene rubber are strictly specified. The resin composition is pelletized from a melted state such that the glass fiber dispersed in the pellets is not smaller than 550 μm and, preferably, not greater than 1100 μm in mean filament length. This resin composition is good in moldability and provides instrument panels high in rigidity, in heat distortion resistance and also in impact resistance.

7 Claims, No Drawings

GLASS FIBER REINFORCED PROPYLENE-ETHYLENE COPOLYMER BASE RESIN COMPOSITION

BACKGROUND OF THE INVENTION

This invention relates to a glass fiber reinforced propylene-ethylene copolymer base resin composition which is useful as an injection molding material and is particularly suited for automobile instrument panels.

Automobile instrument panels have been produced by injection molding of various resins such as ABS resin, glass fiber reinforced ABS resin, polycarbonate resin, polyphenylene oxide resin and polypropylene resin containing talc. However, such conventional resins as the instrument panel molding materials are not fully satisfactory in all aspects. For example, dissatisfaction remains in moldability, resistance to heat distortion or impact resistance, or in an economical aspect.

Polypropylene resins have good and balanced physical and chemical properties and are available at relatively low prices. Accordingly polypropylene resins are widely used as injection molding materials for various parts including automobile parts. For some uses where high rigidity is required of the moldings it is customary to add reinforcing fillers to polypropylene resins, and glass fiber reinforced polypropylene resins are already used when very high rigidity is required.

Automobile manufactures have made trials of glass fiber reinforced polypropylene resins as the injection molding material of instrument panels with particular interest in low prices and excellence in heat distortion resistance of polypropylene resins. Until now, however, fully satisfactory results have not been obtained yet. Rather, it has become evident that conventional glass fiber reinforced polypropylene resins are insufficient in impact resistance, and particularly in surface impact strength when molded into large-sized and intricately shaped members such as automobile instrument panels.

SUMMARY OF THE INVENTION

It is an object of the present invention to provide a glass fiber reinforced propylene-ethylene copolymer base resin composition, which is useful as an injection molding material having good moldability and can provide automobile instrument panels fully satisfactory in rigidity and heat distortion resistance and also in impact resistance.

The present invention provides a glass fiber reinforced resin composition suitable as a molding material for automobile instrument panels, which resin composition comprises an essential blend consisting of (a) 55–77 wt % of a propylene-ethylene block copolymer, which is at least partially modified by graft copolymerization with an unsaturated carboxylic acid or its derivative and exhibits a melt flow index of from 3 to 9 g/10 min at 230° C. under load of 2160 g, (b) 5–15 wt % of an ethylene-propylene rubber in which the content of ethylene is in the range from 60 to 85 wt % and which exhibits a Mooney viscosity, $ML_{1+4}(100°$ C.), or from 60 to 80, and (c) 18–30 wt % of a glass fiber having a filament diameter of from 8 to 15 $\mu$m. The resin composition is pelletized from a melted state such that the glass fiber dispersed in the pelletized resin composition has a mean filament length not smaller than 550 $\mu$m.

As a basis of the present invention we have found that, in glass fiber reinforced polypropylene or propylene-ethylene copolymer resins in the form of pellets convenient for injection modling operations, a mean filament length of the glass fiber dispersed in the pelletized resin composition greatly affects important properties of the moldings such as rigidity, impact resistance and heat distortion resistance. By subsequent experimental studies we have confirmed that full success can be obtained in molding a glass fiber reinforced propylene-ethylene copolymer base resin into automobile instrument panels, or other large-sized members, which are fairly high in rigidity and heat distortion resistance and also in surface impact strength when the glass fiber dispersed in the pelletized resin composition has a mean filament diameter not smaller than 550 $\mu$m, and preferably in the range from 550 to 1100 $\mu$m. Where this condition is met, it is possible to obtain large-sized moldings such as instrument panels in which a mean filament length of the dispersed glass fiber is not smaller than about 350 $\mu$m and, preferably, not longer than about 990 $\mu$m. Controllig the glass fiber filament length in the moldings to such an extent is important for realization of good impact resistance as well as good resistance to heat distortion even at temperatures as high as 115°–120° C.

DESCRIPTION OF THE PREFERRED EMBODIMENTS

In a resin composition according to the invention a primary component is a propylene-ethylene block copolymer which is required to be modified, at least partially, with graft copolymerization of an unsaturated carboxylic acid or its derivative. It is preferred that the content of ethylene in the copolymer is in the range from 3 to 15 wt %, and also it is preferred that the amount of the grafted carboxylic acid component is from 0.05 to 3 wt % of the modified copolymer. There is no strict limitation to the kind of the unsaturated carboxylic acid for grafting, though maleic anhydride and acrylic acid and their derivatives are named as preferred examples. It is permissible to use a mixture of a carboxylc acid modified propylene-ethylene block copolymer and an unmodified propylene-ethylene block copolymer. In any case it is important that the melt flow index of the entire propylene-ethylene copolymer be in the range from 3 to 9 g/10 min when measured at 230° C. under load of 2160 g. If the melt flow index of this component is below 3 g/10 min the glass fiber reinforced resin composition will be inferior in moldability. If the melt flow index of the same component is above 9 g/10 min the resin composition will become low in impact resistance.

The graft modification of a propylene-ethylene block copolymer, which is preferred to be a crystalline copolymer, with an unsaturated carboxylic acid (or its derivative) can be accomplished by mixing the starting copolymer with a selected carboxylic acid and an organic peroxide and melting and kneading the mixture in, for example, an extruder at 175°–280° C. for 1–20 min. The organic peroxide can freely be selected from ones known as practical initiators, though it is preferred to make a selection such that the temperature at which the half-life of the selected peroxide becomes 1 min is higher than the melting point of the employed crystalline propylene-ethylene block copolymer and is not higher than 220° C.

Another essential polymer component of the resin composition is an ethylene-propylene rubber in which the content of ethylene is 60–85 wt %. If desired it is possible to use an ethylene-propylene rubber which is at least partially modified by graft copolymerization with an unsaturated carboxylid acid or its derivative. The content of ethylene in the copolymer rubber is an important factor. If the ethylene content in the rubber is less than 60 wt % the resin composition will not be sufficiently high in rigidity, heat distortion resistance and/or impact resistance. If the same is more than 85 wt % the resin composition will become low in impact resistance. Also it is important to use an ethylene-propylene rubber of which the Mooney viscosity, $ML_{1+4}(100°$ C.), falls in the range from 60 to 80. If the Mooney viscosity of the rubber is below 60 the resin composition will become low in impact resistance and heat distortion resistance. If the same is above 80 it becomes difficult to uniformly disperse the ethylene-propylene rubber in the resin composition so that the impact resistance of the resin composition lowers.

The glass fiber used in this invention has a filament diameter of 8–15 μm. The use of a thinner glass fiber will give a resin composition low in impact resistance, and the use of a thicker glass fiber will result in lowness of rigidity, heat distortion resistance and/or impact resistance. The initial filament length of the glass fiber needs not to be strictly specified. However, in general it is suitable to use glass fiber chopped strands having lengths of 2–15 mm.

It is preferable to use a glass fiber which is subjected, in advance, to a usual surface treatment with a so-called coupling agent. For example, the coupling agent may be vinyltriethoxysilane, vinyltris-(β-methoxyethoxy)silane, γ-methacryloxypropyl trimethoxysilane, γ-glycidoxypropyl trimethoxysilane, n-(dimethoxymethylsilylpropyl)ethylenediamine, n-(trimethoxysilylpropyl)ethylenediamine, γ-aminopropyltriethoxy(or trimethoxy)silane. It is suitable that the adherent coupling agent amounts to 0.05–3 wt % of the glass fiber.

The above described three components are blended so as to provide an essential blend which consists of 55–77 wt %, and preferably 60–75 wt %, of the modified propylene-ethylene block copolymer, 5–15 wt % of ethylene-propylene rubber and 18–30 wt %, and preferably 20–30 wt %, of glass fiber. If the amount of the ethylene-propylene rubber is less than 5 wt % the resin composition will become low in impact resistance. If the amount of the same is more than 15 wt % the resin composition will become low in rigidity and heat distortion resistance. If the amount of the glass fiber is less than 18 wt % the reinforcing effect of the glass fiber is insufficient so that the resin composition will be low in rigidity and heat distortion reistance. If the amount of the same is more than 30 wt % the resin composition will become low in impact resistance.

In addition to the above described essential three components a resin composition according to the invention may optionally contain any of the additives commonly used in conventional resin compositions for injection molding pruposes. For example, the optional additive(s) may be pigment, antioxidant, ultraviolet absorber, flame retardant, antistatic agent, lubricating agent and/or auxiliary filler which can be selected from inorganic and organic materials such as talc, calcium carbonate, mica, barium sulfate, kaolin, fired kaolin, silica, magnesium silicate, zeolite, carbon fiber, aromatic polyamide fiber, potassium titanate fiber, asbestos fiber and boron fiber. Also it is permissible to add a thermoplastic polymer different from propylene-ethylene systems, such as nylon, polyester or polycarbonate.

Of course the amount(s) of the optional additive(s) should be limited so as not to adversely affect the properties of the glass fiber reinforced resin composition.

A glass fiber reinforced resin composition according to the invention can be prepared by a generally known method. It is suitable to prepare the resin composition by the steps of first melting and kneading a mixture of the modified propylene-ethylene block copolymer and the ethylene-propylene rubber in a conventional kneader, adding the glass fiber to the polymer mixture in a melted state and kneading the resultant ternary mixture in a suitable machine such as a single-screw extruder so that adequate shearing force may act on the glass fiber filaments. Finally the kneaded mixture is pelletized by a known method. The conditions of the kneading and pelletizing operations are controlled such that the glass fiber dispersed in the pellets has a mean filament length not smaller than 550 μm and, preferably, not longer than 1100 μm. The pellets of the resin composition may be of any shape. Usually the pellets are in the shape of prisms or solid cylinders which are conveniently 2–5 mm in diameter, 3–10 mm in length and 1–5 in the length-to-diameter ratio.

Injection molding of a glass fiber reinforced and pelletized resin composition according to the invention into, for example, automobile instrument panels can be accomplished by using a conventional injection molding machine.

The invention is further illustrated by the following nonlimitative examples.

EXAMPLES 1 AND 2

In each example a glass reinforced resin composition according to the invention was prepared by blending a propylene-ethylene block copolymer (abbreviated to PEBC) modified by grafting of 0.5 wt % of maleic anhydride, an ethylene-propylene rubber (EPR) and an aminosilane-treated glass fiber (GF) in the form of chopped strands having a mean length of 6 mm. The content of ethylene in PEBC was 8 wt %, whereas the content of ethylene in EPR was 78 wt %. Table 1 shows the amounts of the blended materials together with the melt flow indices of PEBC, Mooney viscosity of EPR and the filament diameter of GP. As can be seen in Table 1, the sole difference of Example 2 from Example 1 was the use of PEBC slightly higher in melt flow index.

As auxiliary additives, 0.2 part by weight of IRGANOX 1010 (an antioxidant supplied from Japan Ciba-Geigy Co.), 0.1 part by weight of BHT (popular antioxidant), 0.2 part by weight of SANOL LS770 (an ultraviolet absorber supplied from Japan Ciba-Geigy Co.) were added to 100 parts by weight of the above described essential blend. The entire mixture was melted and kneaded at 200°–280° C. by using an extruder, and the resultant resin composition was pelletized. The obtained pellets were 2 mm in diameter and 5 mm in length.

Representative physical properties of the resin composition of each example are shown in Table 1. The flexural modulus refers to the modulus of elasticity in bending measured at 115° C. by the method according to JIS K 7203. The falling missile impact strength refers to the amount of energy required for breaking a test piece in the form of a disc 100 mm in diameter and 3 mm in thickness by hitting the test pieced with a missile having a circular nose 25.4 mm in diameter at a velocity of 2.5 m/sec. To find a mean length of GP strands dispersed in the pellets the resin composition was extruded and pressed into a very thin film (about 100 μm), and the film was surveyed under optical microscope to measure the length of each piece of glass fiber filament with respect to more than 200 pieces. An average of the measurements was taken as the mean length of GP in the pellets. The moldability of each resin composition was tested by a standard injection molding method.

Furthermore, each resin composition was used in a practical injection molding operation to form an automobile instrument panel 180 cm in length, 50 cm in vertical width and 50 cm in depth. A mean length of the glass fiber filament dispersed in the obtained instrument panel was found in substantially the same way as in the case of the resin composition pellets. Each instrument panel was subjected to a heat distortion test, in which the panel was kept at an environmental temperature of 85°–92° C. and was irradiated so as to keep a surface temperature of 115° C. (as black panel) for 4 hr. After such heating, the amount of vertical distortion of the frontal and horizontal edge (1400 mm long) was measured. In Table 1, at the line of resistance to heat distortion, the mark "G" means that the amount of the measured distortion was not more than ±1.5 mm and "NG" means that the measured distortion was more than ±1.5 mm. The impact resistance of the instrument panel was examined by the test method according to MVSS No. 201, ECE Item 21. In Table 1 the mark "G" means that the crack generating speed was not more than 3 mmS with the ball weight of at least 80 g and that no sharp edge appeared at the point of impact, and "NG" means different results.

In the subseqent Examples and Comparative Examples, the glass fiber reinforced resin composition of Example 2 was modified in the amounts of the essential three components or in the type or grade of PEBC, EPR or GF. In every case, except Comparative Example 3, PEBC was one modified by grafting of maleic anhydride. There was no change in the blending and pelletizing methods. The resin composition of every example or comparative example and the instrumental panel (as described in Examples 1–2) formed of the same were subjected to the above described tests.

COMPARATIVE EXAMPLES 1–3

The particulars are shown in Table 1. In Comparative Example 1 the melt flow index of PEBC was very low, and in Comparative Example 2 the same was very high. In Comparative Example 3 an unmodified PEBC was used. Each of such differences resulted in degradation of the resin composition or the molding in at least one aspect.

COMPARATIVE EXAMPLES 4–6

The particulars are shown in Table 1. In these cases, the Mooney viscosity of EPR or the content of ethylene in EPR was outside the range specified in the present invention.

TABLE 1

|  | Ex. 1 | Ex. 2 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|
| Materials | | | | | | | | |
| PEBC | | | | | | | | |
| melt flow index (g/10 min) | 4 | 7 | 1 | 20 | 7 | 7 | 7 | 7 |
| grafting of maleic anhydride (wt %) | 0.5 | 0.5 | 0.5 | 0.5 | 0 | 0.5 | 0.5 | 0.5 |
| amount in the composition (wt %) | 65 | 65 | 65 | 65 | 65 | 65 | 65 | 65 |
| EPR | | | | | | | | |
| Mooney viscosity ($ML_{1+4}$, 100° C.) | 70 | 70 | 70 | 70 | 70 | 10 | 105 | 70 |
| ethylene content (wt %) | 78 | 78 | 78 | 78 | 78 | 75 | 75 | 32 |
| amount in the composition (wt %) | 10 | 10 | 10 | 10 | 10 | 10 | 10 | 10 |
| GF | | | | | | | | |
| diameter (μm) | 10 | 10 | 10 | 10 | 10 | 10 | 10 | 10 |
| amount in the composition (wt %) | 25 | 25 | 25 | 25 | 25 | 25 | 25 | 25 |
| Properties of Resin Composition | | | | | | | | |
| flexural modulus (kg/cm$^2$) | 12400 | 12400 | 12300 | 12500 | 10500 | 11900 | 12100 | 12400 |
| Izod impact value (kg-cm/cm) | 27 | 24 | 31 | 20 | 12 | 22 | 23 | 20 |
| falling missile impact strength (kg-cm) | 75 | 70 | 92 | 43 | 10 | 51 | 50 | 47 |
| mean length of GF in pellets (μm) | 630 | 630 | 600 | 640 | 630 | 630 | 630 | 630 |
| moldability | good | good | bad | good | good | good | good | good |
| Instrument Panel | | | | | | | | |
| resistance to heat distortion | G | G | G | G | NG | NG | G | G |
| impact resistance | G | G | G | NG | NG | NG | NG | NG |
| mean length of GF (μm) | 450 | 450 | 440 | 450 | 450 | 450 | 430 | 440 |

EXAMPLES 3 AND 4

The particulars are shown in Table 2. The amounts of PEBC and EPR were varied.

COMPARATIVE EXAMPLES 7 AND 8

The particulars are shown in Table 2. The amounts of PEBC and EPR were varied to result in shortage or excess of EPR.

EXAMPLE 5

The particulars are shown in Table 3. The amounts of PEBC and GF were varied.

COMPARATIVE EXAMPLES 9 AND 10

The particulars are shown in Table 3. The amounts of PEBC and GF were varied to result in shortage or excess of GF.

EXAMPLE 6

The particulars are shown in Table 3. The sole difference from Example 5 was the larger diameter of the filament of glass fiber chopped strands.

COMPARATIVE EXAMPLES 11–13

The particulars are shown in Table 3. The glass fibers used in these cases were excessively small or excessively large in filament diameter. In Comparative Example 13, the condition of the melt-kneading operation using the extruder was varied so as to increase the shearing force to thereby promote severance of the glass fiber filaments. In the obtained pellets of the resin composition the mean length of GF was as short as 380 μm, and consequently the mean lenth of GF dispersed in the molded instrument panel was only 210 μm.

TABLE 2

|  | Ex. 3 | Ex. 4 | Comp. Ex. 7 | Comp. Ex. 8 |
|---|---|---|---|---|
| Materials | | | | |
| PEBC | | | | |
| melt flow index (g/10 min) | 7 | 7 | 7 | 7 |
| grafting of maleic anhydride (wt %) | 0.5 | 0.5 | 0.5 | 0.5 |
| amount in the composition (wt %) | 68 | 62 | 72 | 55 |
| EPR | | | | |
| Mooney viscosity (ML$_{1+4}$,100° C.) | 70 | 70 | 70 | 70 |
| ethylene content (wt %) | 78 | 78 | 78 | 78 |
| amount in the composition (wt %) | 7 | 13 | 3 | 20 |
| GF | | | | |
| diameter (μm) | 10 | 10 | 10 | 10 |
| amount in the composition (wt %) | 25 | 25 | 25 | 25 |
| Properties of Resin Composition | | | | |
| flexural modulus (kg/cm$^2$) | 13200 | 11700 | 14300 | 9800 |
| Izod impact value (kg-cm/cm) | 22 | 28 | 18 | 36 |
| falling missile impact strength (kg-cm) | 58 | 82 | 43 | 102 |
| mean length of GF in pellets (μm) | 630 | 630 | 640 | 620 |
| moldability | good | good | good | good |
| Instrument Panel | | | | |
| resistance to heat distortion | G | G | G | NG |
| impact resistance | G | G | NG | G |
| mean length of GF (μm) | 450 | 430 | 440 | 410 |

TABLE 3

|  | Ex. 3 | Comp. Ex. 9 | Comp. Ex. 10 | Comp. Ex. 11 | Ex. 6 | Comp. Ex. 12 | Comp. Ex. 13 |
|---|---|---|---|---|---|---|---|
| Materials | | | | | | | |
| PEBC | | | | | | | |
| melt flow index (g/10 min) | 4 | 7 | 7 | 7 | 7 | 7 | 7 |
| grafting of maleic anhydride (wt %) | 0.5 | 0.5 | 0.5 | 0.5 | 0.5 | 0.5 | 0.5 |
| amount in the composition (wt %) | 70 | 75 | 55 | 70 | 70 | 70 | 70 |
| EPR | | | | | | | |
| Mooney viscosity (ML$_{1+4}$,100° C.) | 70 | 70 | 70 | 70 | 70 | 70 | 70 |
| ethylene content (wt %) | 78 | 78 | 78 | 78 | 78 | 78 | 78 |
| amount in the composition (wt %) | 10 | 10 | 10 | 10 | 10 | 10 | 10 |
| GF | | | | | | | |
| diameter (μm) | 10 | 10 | 10 | 6 | 13 | 25 | 25 |
| amount in the composition (wt %) | 20 | 15 | 35 | 20 | 20 | 20 | 20 |
| Properties of Resin Composition | | | | | | | |
| flexural modulus (kg/cm$^2$) | 11100 | 8700 | 15500 | 11800 | 10900 | 10300 | 7600 |
| Izod impact value (kg-cm/cm) | 22 | 20 | 29 | 19 | 21 | 17 | 15 |
| falling missile impact strength (kg-cm) | 58 | 46 | 50 | 47 | 58 | 45 | 30 |
| mean length of GF in pellets (μm) | 630 | 630 | 620 | 600 | 630 | 630 | 380 |
| moldability | good | good | good | good | good | good | good |
| Instrument Panel | | | | | | | |
| resistance to heat distortion | G | NG | G | G | G | NG | NG |
| impact resistance | G | NG | NG | NG | G | NG | NG |
| mean length of GF (μm) | 440 | 440 | 420 | 400 | 430 | 430 | 210 |

What is claimed is:

1. A glass fiber reinforced resin composition suitable as a molding material for automobile instrument panels, the resin composition comprising an essential blend which consists of:
   55-77 wt % of a propylene-ethylene block copolymer which is a least partially modified by graft copolymerization with an unsaturated carboxylic acid or its derivative and exhibits a melt flow index of from 3 to 9 g/10 min at 230° C. under load of 2160 g;
   5-15 wt % of an ethylene-propylene rubber in which the content of ethylene is in the range from 60 to 85 wt % and which exhibits a Mooney viscosity, ML$_{1+4}$(100° C.), of from 60 to 80; and
   18-30 wt % of a glass fiber having a filament diameter of from 8 to 15 μm,
   the resin composition being pelletized from a melted state such that the glass fiber dispersed in the pelletized resin composition has a mean filament length not smaller than 550 μm.

2. A resin composition according to claim 1, wherein said mean filament length of the glass fiber is not greater than 1100 μm.

3. A resin composition according to claim 2, wherein said glass fiber is treated with a coupling agent in advance.

4. A resin comosition according to claim 1, wherein the content of ethylene in said propylene-ethylene block copolymer is in the range from 3 to 15 wt %.

5. A resin composition according to claim 4, wherein said carboxylic acid or its derivative amounts to 0.05-3 wt % of the modified propylene-ethylene block copolymer.

6. A resin composition according to claim 4, wherein said unsaturated carboxylic acid is selected from the group consisting of maleic anhydride and acrylic acid.

7. A resin composition according to claim 1, wherein the amount of the modified propylene-ethylene block copolymer in said essential blend is from 60 to 75 wt %, the amount of said glass fiber in said essential blend being from 20 to 30 wt %.

* * * * *